United States Patent
Shin et al.

(10) Patent No.: US 9,912,245 B2
(45) Date of Patent: Mar. 6, 2018

(54) SYNCHRONOUS RECTIFIER CONTROL METHOD FOR A NON-ISOLATED DC/DC CONVERTER HAVING A TRANSFORMER WITH CROSS CONNECTED CAPACITORS

(71) Applicant: TOYOTA MOTOR ENGINEERING & MANUFACTURING NORTH AMERICA, INC., Erlanger, KY (US)

(72) Inventors: Jongwon Shin, Ann Arbor, MI (US); Masanori Ishigaki, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 15/056,046

(22) Filed: Feb. 29, 2016

(65) Prior Publication Data
US 2017/0250615 A1 Aug. 31, 2017

(51) Int. Cl.
*H02M 3/335* (2006.01)

(52) U.S. Cl.
CPC .... *H02M 3/33592* (2013.01); *H02M 3/33546* (2013.01); *H02M 3/33576* (2013.01)

(58) Field of Classification Search
CPC ......... H02M 3/33569; H02M 3/33576; H02M 3/33584; H02M 3/33592
See application file for complete search history.

(56) References Cited

U.S. PATENT DOCUMENTS

| | | | |
|---|---|---|---|
| 6,765,810 B2 | 7/2004 | Perry | |
| 6,934,167 B2 * | 8/2005 | Jang | H02J 5/005 363/21.02 |
| 7,158,392 B2 | 1/2007 | Hosokawa et al. | |
| 7,764,518 B2 | 7/2010 | Jitaru | |
| 7,876,581 B2 * | 1/2011 | Kim | H01F 27/38 363/16 |
| 8,040,696 B2 | 10/2011 | Wu et al. | |
| 9,099,928 B2 | 8/2015 | Lu | |
| 2002/0021577 A1 * | 2/2002 | Lau | H02M 3/33592 363/125 |

(Continued)

FOREIGN PATENT DOCUMENTS

EP 2157682 A1 2/2010

OTHER PUBLICATIONS

"UCC24630 Synchronous Rectifier Controller with Ultra-Low-Standby Current", Texas Instruments, 40 Pages total, (Mar. 2015).
"FAN6224 Synchronous Rectification Controller for Flyback and Forward Freewheeling Rectification", Fairchild Semiconductor Corporation, 19 Pages total, (Sep. 2015).
"TEA1761T GreenChip Synchronous Rectifier Controller", NXP, 13 Pages total, (Apr. 25, 2007).

(Continued)

*Primary Examiner* — Gary L Laxton
*Assistant Examiner* — Peter Novak
(74) *Attorney, Agent, or Firm* — Oblon, McClelland, Maier & Neustadt, L.L.P.

(57) ABSTRACT

A power system includes DC-DC power conversion circuitry that has a first switch and a second switch on either side of a transformer, and the second switch is operates as a synchronous rectifier. Power transfer from a primary side to secondary side of the DC-DC power conversion circuitry is controlled by operating the first switch. A drive signal for the second switch is calculated based on a sensed transformer winding current, and operation of the second switch is controlled based on the drive signal.

17 Claims, 7 Drawing Sheets

(56) References Cited

U.S. PATENT DOCUMENTS

| | | | | |
|---|---|---|---|---|
| 2005/0152158 A1* | 7/2005 | Gut | ............... | H02M 3/33592 363/16 |
| 2009/0207637 A1* | 8/2009 | Boeke | ............... | H02M 3/33592 363/21.14 |
| 2009/0244934 A1* | 10/2009 | Wang | ............... | H02M 3/33592 363/21.06 |
| 2010/0027298 A1* | 2/2010 | Cohen | ............... | H02M 3/33592 363/21.14 |
| 2014/0029311 A1* | 1/2014 | Lu | ............... | H02M 3/24 363/16 |
| 2015/0117068 A1 | 4/2015 | Yin et al. | | |
| 2015/0280584 A1* | 10/2015 | Gong | ............... | H02M 3/33515 363/21.13 |

OTHER PUBLICATIONS

"IR1167(A,B)S Smart Rectifier Control IC", International Rectifier, 25 Pages total, (Nov. 6, 2013).

Huang, X., et al., "A Novel Driving Scheme for Synchronous Rectifier in MHz CRM Flyback Converter with GaN Devices", Institute of Electrical and Electronics Engineers, 7 Pages total, (2015).

Xie, X., et al., "An Improved Current-Driven Method for Synchronous Flyback AC/DC Converters", Institute of Electrical and Electronics Engineers, 5 Pages total, (2006).

Zhang, J.M., et al., "A High Efficiency Adapter with Novel Current Driven Synchronous Rectifier", International Telecommunications Energy Conference, 6 Pages total, (2003).

\* cited by examiner

SYNCHRONOUS RECTIFIER CONTROL METHOD FOR A NON-ISOLATED DC/DC CONVERTER HAVING A TRANSFORMER WITH CROSS CONNECTED CAPACITORS

CROSS-REFERENCE TO RELATED PATENT APPLICATIONS

The present application incorporates by reference the entire contents of U.S. patent application Ser. No. 14/504,125 having common inventorship with the present application and filed in the U.S. Patent and Trademark Office on Oct. 1, 2014.

BACKGROUND

Synchronous rectifiers are actively controlled switches that can replace diodes in power conversion circuits in order to reduce losses and improve efficiency. U.S. Pat. No. 7,158,392 to Hosokawa et al. describes a power conversion circuit that controls operations of a synchronous rectifier to turn off the synchronous rectifier based on changes in load currents at the secondary side or input voltages in order to decrease losses at the secondary side.

SUMMARY

In an exemplary implementation, a power system includes DC-DC power conversion circuitry that has a first switch and a second switch on either side of a transformer, and the second switch is operates as a synchronous rectifier. Power transfer from a primary side to secondary side of the DC-DC power conversion circuitry is controlled by operating the first switch. A drive signal for the second switch is calculated based on a sensed transformer winding current, and operation of the second switch is controlled based on the drive signal.

The DC-DC power conversion circuitry can include a first capacitor and a second capacitor cross-connected across the transformer.

The primary side and the secondary side of the DC-DC power conversion circuitry can be symmetric across the transformer, and the DC-DC power conversion circuitry can be configured to perform bi-directional power transfer. The first switch can be configured to operate as the synchronous rectifier when power is transferred from the secondary side to the primary side of the DC-DC power conversion circuitry.

The DC-DC power conversion circuitry can include a first diode in parallel with the first switch and a second diode in parallel with the second switch.

The sensed transformer winding current can correspond to a transformer winding on a side of the DC-DC power conversion circuitry corresponding to the second switch.

The system can calculate the drive signal for the second switch independent of a voltage or current of the first switch or the second switch.

The system can synchronize an on period of the second switch to a synchronous rectifier current that is greater than zero.

The control circuitry can include a RS latch that can output the drive signal to the second switch. A latch set signal can correspond to a turn-on of the second switch and a latch reset signal can correspond to a turn-off of the second switch. The control circuitry can generate the latch set signal based on an inverted sensed transformer winding current that can be differentiated. The latch set signal can also be generated when the inverted sensed transformer winding current is less than a first threshold. The latch reset signal can be generated based on the sensed transformer winding current which can also include a differentiation of the sensed transformer winding current. The latch reset signal can be generated when the sensed transformer winding current is greater than a second threshold.

In a further implementation, a process can include: controlling power transfer from a primary side to secondary side of DC-DC power conversion circuitry with a first switch and a second switch on either side of a transformer where the second switch can be configured to operate as a synchronous rectifier via the first switch; calculating a drive signal for the second switch based on a sensed transformer winding current; and controlling operation of the second switch based on the drive signal. A non-transitory computer-readable storage medium including executable instructions, which when executed by circuitry, can cause the circuitry to perform the process.

In a further exemplary implementation, a system controller includes control circuitry that can control power transfer from a primary side to secondary side of DC-DC power conversion circuitry with a first switch and a second switch on either side of a transformer where the second switch can be configured to operate as a synchronous rectifier via the first switch; calculate a drive signal for the second switch based on a sensed transformer winding current; and control operation of the second switch based on the drive signal.

The foregoing general description of exemplary implementations and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "about," and similar terms generally refer to ranges that include the identified value within a margin of 20%, 10%, or preferably 5%, and any values therebetween.

Figure 1A:
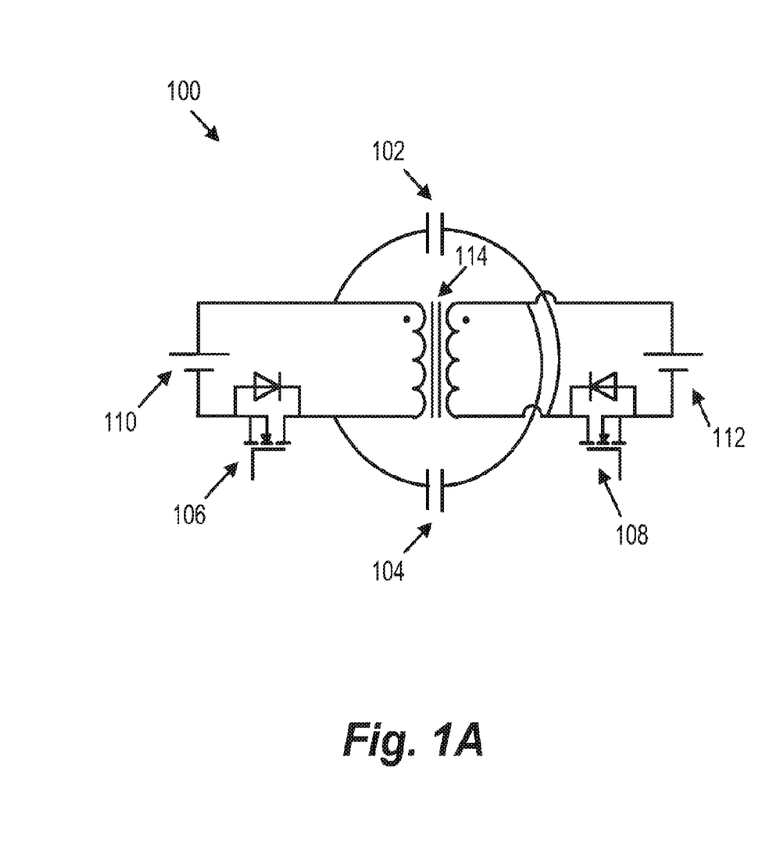
FIG. 1A is an exemplary illustration of an isolated DC-DC power conversion circuit.

FIG. 1A is an exemplary illustration of an isolated DC-DC power conversion circuit 100. The isolated DC-DC power conversion circuit 100 can include a primary side and a secondary side that are symmetrical on either side of a magnetic core transformer 114. In an exemplary implementation, capacitors 102 and 104 can be cross-connected across the magnetic core transformer 114. The primary side can include a primary switch 106 and a primary DC power source 110, and the secondary side can include a secondary switch 108 and a secondary DC power source 112. The primary DC power source 110 and the secondary DC power source 112 can function as either a power source or power sink depending on a direction of power transfer. In an implementation, the capacitance values of the cross-connected capacitors 102 and 104 can be equal. In some aspects, the turn ratio N of the magnetic core transformer 114 is determined based on the ratio of the voltage of the primary DC power source 110 to the voltage of the secondary DC power source 112.

In certain implementations, the isolated DC-DC power conversion circuit 100 can be installed in an electrical system of a vehicle in order to transfer power from power sources to electrical loads. In some implementations, electrical components within a vehicle can act as either power sources or electrical loads depending on the application being carried out. For example, battery cells in an electric vehicle can act as an electrical load during charging operations when the vehicle is connected via a plug to an AC outlet. On the other hand, the battery cells can also act as power sources during discharge operations.

In order to allow the electrical components to operate as either power sources or electrical loads, the isolated DC-DC power conversion circuit 100 can operate bi-directionally due to the symmetry between the primary and secondary sides. More specifically, power can be transferred from the primary side to the secondary side or from the secondary side to the primary side. The direction of power transfer is based on whether the primary switch 106 or the secondary switch 108 is turned on and off. For example, if power is being transferred from the primary side to the secondary side, the primary switch 106 is cycled on and off. If power is being transferred from the secondary side to the primary side, the secondary switch 108 is cycled on and off. In some implementations, the primary switch 106 and secondary switch 108 are controlled by gate drivers that are integrated into the primary switch 106 and the secondary switch 108.

The primary switch 106 and the secondary switch 108 can include a MOSFET with a diode connected in parallel from the source to the drain of the MOSFET, providing a parallel path for current to flow when the primary switch 106 or the secondary switch 108 is turned off. As power is transferred from the primary side to the secondary side of the isolated DC-DC power conversion circuit 100 by cycling the primary switch 106 on and off, the secondary switch 108 can be turned on and off to function as a synchronous rectifier (SR), which can reduce switching losses and improve circuit efficiency. For example, the on-time of the secondary switch 108 can be synchronized to when the current through the secondary switch 108 is greater than zero.

Likewise, as power is transferred from the secondary side to the primary side of the isolated DC-DC power conversion circuit 100 by cycling the secondary switch 108 on and off, the secondary switch 108 can be turned on and off to function as the SR. Throughout the disclosure, the control of the SR is described with respect to transferring power from the primary side to the secondary side of the isolated DC-DC power conversion circuit 100, but the description could similarly apply to transferring power from the secondary side to the primary side of the isolated DC-DC power conversion circuit 100. Details regarding control and operation of the SR are discussed further herein. In addition, the secondary switch 108 can be interchangeably referred to as the SR throughout the disclosure. In other implementations when the secondary switch 108 may not be operated as a SR, and current flows through the diode in parallel with the secondary switch 108 as power is transferred from the primary side to the secondary side of the isolated DC-DC power conversion circuit 100.

Figure 1B:
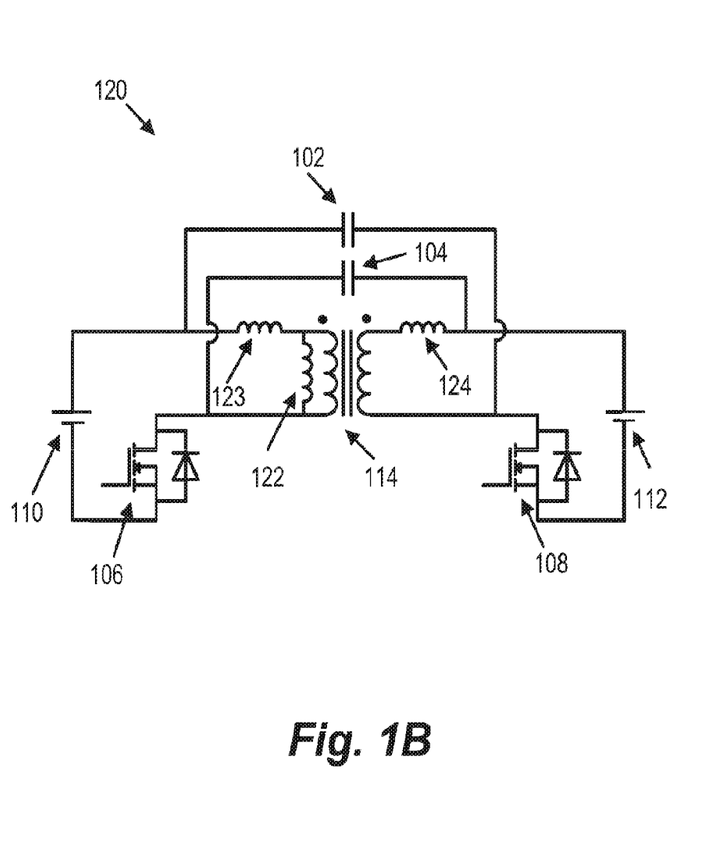
FIG. 1B is an exemplary illustration of an isolated DC-DC power conversion circuit.

FIG. 1B is another exemplary illustration of an isolated DC-DC power conversion circuit 120. In addition to the components described with respect to the isolated DC-DC power conversion circuit 100 of FIG. 1A, the isolated DC-DC power conversion circuit 120 can also include an excitation inductor 122 and leakage inductors 123 and 124. In some aspects, the leakage inductor 123 is on the primary side and the leakage inductor 124 is on the secondary side of the isolated DC-DC power conversion circuit 120. In some implementations, the magnetic core transformer 114 can be an ideal transformer, and the excitation inductor 122 and/or the leakage inductors 123 and 124 can illustrate an equivalent circuit for a real transformer. The excitation inductor 122 can be added in parallel with the primary side of the magnetic core transformer 114 in order to account for non-zero reluctance within the magnetic core transformer. In addition, the leakage inductors 123 and 124 can demonstrate how imperfect coupling within the magnetic core transformer 114 can affect the functionality of the isolate DC-DC power conversion circuit 120. In order to provide a more concise description, the isolated DC-DC power conversion circuit 100 and 120 can be referred to interchangeably throughout the disclosure.

Figure 2A:
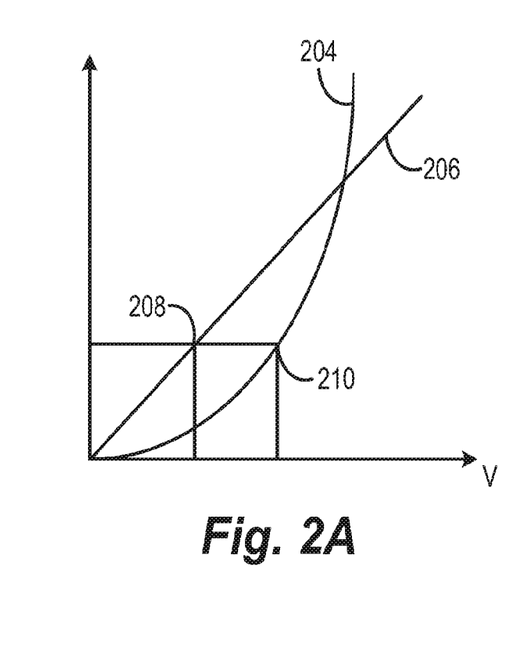
FIG. 2A is an exemplary graph of operating curves for a diode and synchronous switch.

FIG. 2A is an exemplary graph of voltage versus current for diode and synchronous rectifier operations. For example, curve 206 represents a voltage versus current curve for a SR, such as the secondary switch 108 of the isolated DC-DC power conversion circuit 100. Curve 204 represents a voltage versus current curve for a diode, such as the diode in parallel with the secondary switch 108. In some implementations, activating the SR at predetermined times during the duty cycle of the primary switch 106 can improve circuit efficiency. For example, a MOSFET such as the secondary switch 108 has a lower voltage drop across it when turned on than the parallel diode, therefore operating the secondary switch 108 as a SR can reduce losses through the isolated DC-DC power conversion circuit 100. For example, the graph of FIG. 2A shows that for a given current, the voltage across the SR as shown at point 208 is less than the voltage across the diode as shown at point 210.

Figure 2B:
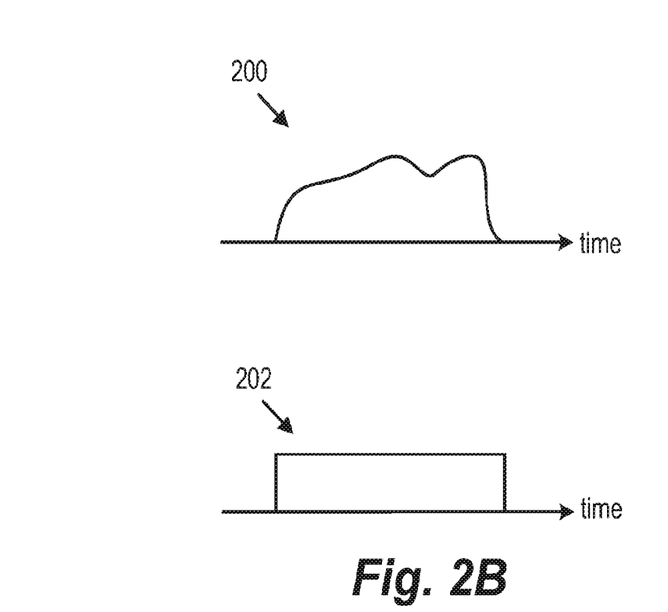
FIG. 2B is an exemplary graph of a current signal and synchronous rectifier drive signal.

FIG. 2B is an exemplary graph of a current signal and a corresponding synchronous rectifier drive signal. For example, curve 200 represents the current through the secondary switch 108, and curve 202 represents the corresponding SR drive signal. In some implementations, the gate drivers for the primary switch 106 and secondary switch 108 are controlled by a controller, such as an electronic control unit (ECU). The controller includes control circuitry that receives sensor data from one or more sensors that measure operational parameters of the isolated DC-DC power conversion circuit 100 and issues control signals to turn on and off the primary switch 106 and/or the secondary switch 108 based on the operational parameters, timing of duty cycles, or amount power transfer. The operational parameters can include any type of sensed parameter at various points of the isolated DC-DC power conversion circuit, such as current, voltage, temperature, or the like. In one implementation, the controller outputs the SR drive signal 202 to turn on the secondary switch 108 when the current through the secondary switch 108 is greater than zero. In addition, the controller determines when to turn the secondary switch 108 on and off based on sensor data received from a current sensor that measures winding current of the transformer 114 on a side of the DC-DC power conversion circuit 100 that corresponds to the SR. For example, if power is transferred from the primary side to the secondary side, and the SR is the secondary switch 108, the sensed transformer winding current received by the controller is from the secondary side transformer winding.

Figure 3:
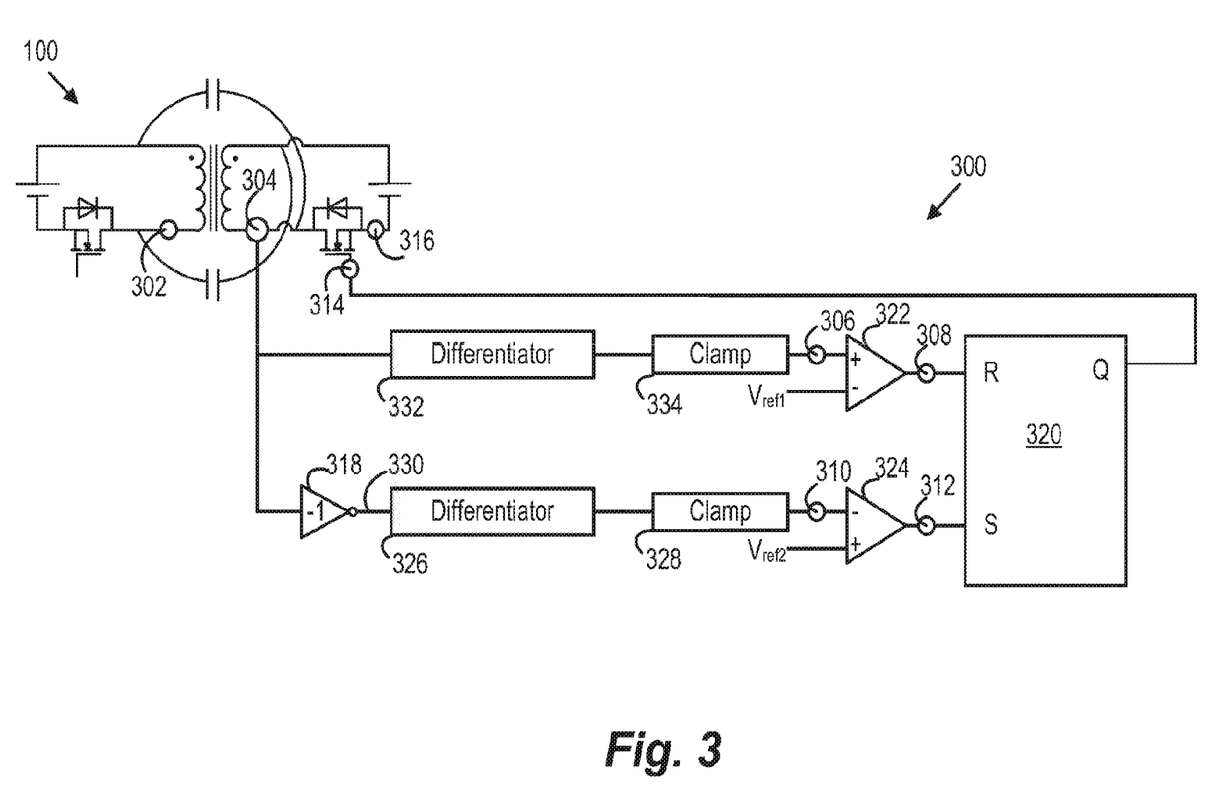
FIG. 3 is an exemplary illustration of a synchronous rectifier controller.

FIG. 3 is an exemplary schematic diagram of the isolated DC-DC power conversion circuit 100 with an associated synchronous rectifier (SR) controller 300. The SR controller 300 controls the activation and deactivation of the gate driver of the secondary switch 108 that functions as the SR as power is transferred from the primary side to the secondary side of the isolated DC-DC power conversion circuit 100. The SR controller 300 can also be similarly connected to the primary side of the isolated DC-DC power conversion circuit 100 to activate the primary switch 106 as the SR when power is transferred from the secondary side to the primary side of the isolated DC-DC power conversion circuit 100. In some implementations, the SR controller 300 may have hardwire connections with a current sensor device to receive sensor data regarding secondary transformer winding current 304 and with the gate driver circuit of the secondary switch 108 to issue an SR drive signal 314 to turn the SR on and off. The isolated DC-DC power conversion circuit 100 can also have any other type of electrical connection with the controller 300. For example, the sensor devices that measure the operational parameters, such as the secondary transformer winding current 304, the gate drivers for the primary switch 106 and secondary switch 108, and the controller 300 can be configured with wireless transceivers to exchange sensor data, control signals, and any other type of information via a wireless network.

In some implementations, the functional architecture represented by the controller 300 is just one of multiple control algorithms associated with the isolated DC-DC power conversion circuit 100 performed by the controller 300. For example, the controller 300 can control transfer of power between the primary and secondary sides of the isolated DC-DC power conversion circuit 100, detect component failures based on received sensor data, and the like. In addition, the illustrated schematic components of the controller 300 can be individual circuit components or can represent software processes that are executed by the control circuitry of the controller 300. The controller 300 can also be implemented in other types of power conversion circuits that include SRs. For purposes of clarity of the figure, the reference numbers for the isolated DC-DC power conversion circuit 100 from FIG. 1 are not shown in FIG. 3 but can be assumed to apply to the isolated DC-DC power conversion circuit 100 in FIG. 3 as well.

In some aspects the SR drive signal 314 output from an edge-sensitive RS latch 320 of the controller 300 is based on the sensed secondary transformer winding current 304, which can have less noise than sensed current or voltage of the primary switch 106 or secondary switch 108. The sensed transformer winding current 304 is inverted at inverter 318 to produce an inverted transformer winding current signal 330, and the control circuitry of the controller 300 determines the RS latch set signal 312 based on the inverted transformer winding current signal 330. For example, a differentiation of the inverted transformer winding current 330 is performed at differentiator 326, and clamp 328 clamps the inverted transformer winding current signal 330 within a predetermined voltage range that corresponds to reference voltages for comparators 322 and 324. In one implementation, the inverted transformer winding current signal 330 is clamped within a range from the first reference voltage $V_{ref1}$ to the second reference voltage $V_{ref2}$ but other voltage ranges can also be used. The clamp 328 outputs inverted comparison input 310, which can be compared to the second reference voltage $V_{ref2}$ at the comparator 324. In addition, the comparator 324 can output the RS latch set signal 312 when the inverted comparison input 310 is less than the second reference voltage $V_{ref2}$. In some implementations, the SR drive signal 314 turns on the secondary switch 108 on a rising edge of the RS latch set signal 312.

In addition, the RS latch reset signal 308 is based on the sensed transformer winding current 304. For example, a differentiation of the transformer winding current 304 is performed at differentiator 332, and clamp 334 clamps the secondary transformer winding current 304 within a predetermined voltage range that corresponds to reference voltages for comparators 322 and 324. In one implementation, the secondary transformer winding current 304 is clamped within a range from the first reference voltage $V_{ref1}$ to the second reference voltage $V_{ref2}$ but other voltage ranges can also be used. In addition, the clamp 334 may clamp the secondary transformer winding current 304 within the same voltage range as the clamp 328, but a different voltage range may also be used. The clamp 334 outputs sensed comparison input 306, which can be compared to the first reference voltage $V_{ref1}$ at the comparator 322. In addition, the comparator 322 can output the RS latch reset signal 308 when the sensed comparison input 306 is greater than the first reference voltage $V_{Vref1}$. In some implementations, the SR drive signal 314 turns off the secondary switch 108 on arising edge of the RS latch reset signal 308.

The RS set signal 312 and the RS latch reset signal 308 can produce the SR drive signal 314 so that the on-time of the secondary switch 108 is synchronized to when a SR current 316 is greater than zero. For example, the secondary switch 108 is turned on when the SR current 316 increases above zero and is turned off prior to the SR current 316 reaching zero as power is transferred from the primary side to the secondary side of the isolated DC-DC power conversion circuit 100 by cycling the primary switch 106 on and off. By synchronizing the on-time of the SR to correspond to when the SR current 316 is greater than zero, the SR improves efficiency of the isolated DC-DC power conversion circuit 100 without interfering with a power transfer duty cycle of the primary switch 106. In addition, even though the SR drive signal 314 is synchronized to the SR current 316 that is greater than zero, the SR drive signal 314 is calculated independently of a current or voltage through the primary switch 106 or secondary switch 108.

Figure 4:
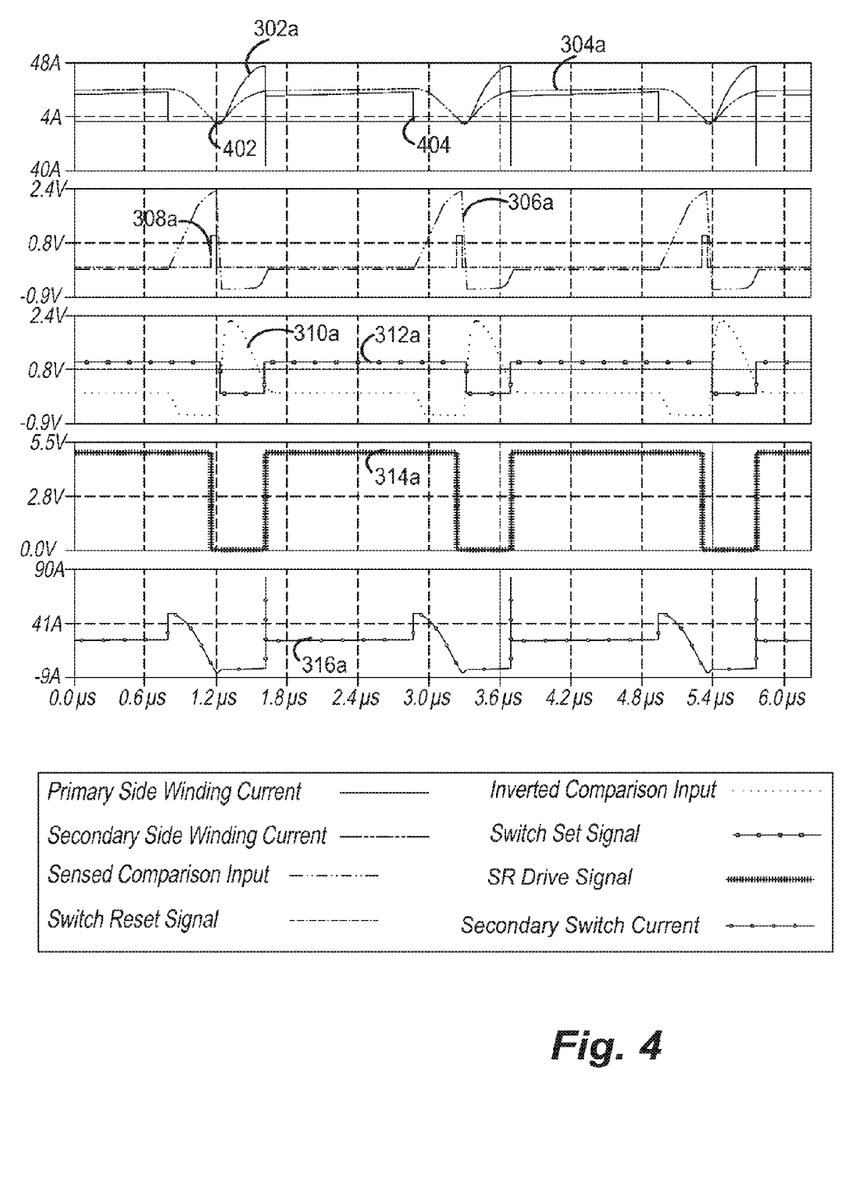
FIG. 4 is an exemplary illustration of graphs of currents and voltages of a DC-DC power conversion circuit and synchronous rectifier controller.

FIG. 3 also includes multiple test points that have corresponding graphs in FIG. 4. For example, primary winding current test point 302 corresponds to graph 302a in FIG. 4, secondary transformer winding current 304 corresponds to graph 304a, sensed comparison input 306 corresponds to graph 306a, RS latch reset signal 308 corresponds to graph 308a, inverted comparison input 310 corresponds to graph 310a, RS latch set signal 312 corresponds to graph 312a, SR drive signal 314 corresponds to graph 314a, and secondary switch (SR) current 316 corresponds to graph 316a.

FIG. 4 is an exemplary illustration of graphs of currents and voltages during operation of the isolated DC-DC power conversion circuit 100 with the SR controller 300. The graph 302a represents a winding current of the transformer 114 on the primary side of the isolated DC-DC power conversion circuit 100 as power is transferred from the primary side to the secondary side of the isolated DC-DC power conversion circuit 100. In some implementations, the controller 300 can operate the primary switch 108 with soft switching that includes zero current switching (ZCS) at turn-on and zero voltage switching (ZVS) at turn-off. For example, the primary switch 108 is turned on at time 402 when the current on the primary side is approximately zero in order to implement ZCS. Likewise, the primary switch 108 is turned off at time 404 when a voltage on the primary side is approximately zero to implement ZVS. During one duty cycle of the primary switch 108, power is transferred from the primary to the secondary side of the isolated DC-DC power conversion circuit 100 via the transformer 114, which can be referred to as inductive power transfer, and via the cross-connected capacitors 102 and 104 and leakage inductors 123 and 124, which can be referred to as capacitive power transfer.

The graph 304a represents the secondary transformer winding current 304 of the transformer 114 of the isolated DC-DC power conversion circuit 100 as power is transferred from the primary side to the secondary side of the isolated DC-DC power conversion circuit 100. The secondary transformer winding current 304 is produced due to the inductive coupling across the transformer 114 as well as due to the capacitive power transfer that occurs via the capacitors 102 and 104 and leakage inductors 123 and 124. In some implementations, the controller 300 computes the SR drive signal 314 based on the secondary transformer winding current 304 that is sensed by a current sensor installed at the secondary winding of the transformer 114 because the sensed secondary transformer winding current 304 has less noise than sensed current or voltage of the primary switch 106 or secondary switch 108.

The graph 306a represents the sensed comparison input 306 to the first comparator 322 of the controller 300 that generates the RS latch reset signal 308 as shown by the graph 308a. As stated previously, the RS latch reset signal 308 is based on the sensed transformer winding current 304 that is differentiated at differentiator 332, and clamped within the predetermined voltage range at the clamp 334. The clamp 334 outputs the sensed comparison input 306, which can be compared to the first reference voltage $V_{ref1}$ at the comparator 322. In addition, the comparator 322 can output the RS latch reset signal 308 when the sensed comparison input 306 is greater than the first reference voltage $V_{ref1}$ as shown in the graph 308a where pulses are generated when the voltage of the sensed comparison input 306 shown in the graph 306a is greater than a predetermined voltage. In some implementations, the rising edge of the RS latch reset signal 308 corresponds to a time when the secondary switch 108 is turned off by the controller 300.

The graph 310a represents the inverted comparison input 310 to the second comparator 324 of the controller 300 that generates the RS latch set signal 312 as shown by the graph 312a. As stated previously, the RS latch set signal 310 is based on the inverted transformer winding current 330 that is differentiated at differentiator 326, and clamped within the predetermined voltage range at the clamp 328. The clamp 334 outputs the sensed comparison input 306, which can be compared to the first reference voltage $V_{ref1}$ at the comparator 322 In addition, the comparator 322 can output the RS latch set signal 310 when the inverted comparison input 310 is less than the second reference voltage $V_{ref2}$ as shown in the graph 312a where signals are generated when the voltage of the inverted comparison input 310 shown in the graph 310a is less than a predetermined voltage. In some implementations, the rising edge of the RS latch set signal 310 corresponds to a time when the secondary switch 108 is turned on by the controller 300.

The graph 314a represents the SR drive signal 314 output by the controller 300 via the edge-sensitive RS latch 320. The RS set signal 312 and the RS latch reset signal 308 can produce the SR drive signal 314 so that the on-time of the secondary switch 108 is synchronized to when a current through the SR 316 is greater than zero, as shown by the graph 316a. For example, the secondary switch 108 is turned on when the SR current 316 increases above zero and is turned off prior to the SR current 316 reaching zero as power is transferred from the primary side to the secondary side of the isolated DC-DC power conversion circuit 100 by cycling the primary switch 106 on and off.

Figure 5:
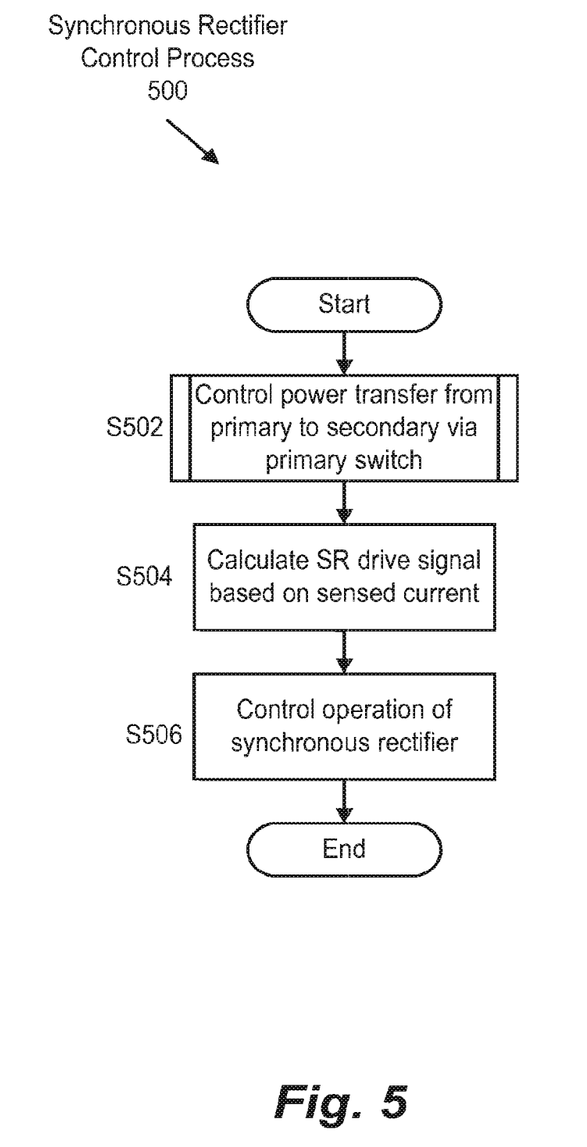
FIG. 5 is an exemplary flowchart of a synchronous rectifier control process.

FIG. 5 is an exemplary flowchart of a synchronous rectifier (SR) control process 500. The SR control process 500 can be performed by the controller 300 with one or more ECUs or similar control circuitry. The ECUs of the controller 300 can process sensor data, display electric power module information to a user, and send control signals to actuators that activate components of the isolated DC-DC power conversion circuit 100 as well as power sources or electrical loads connected to the isolated DC-DC power conversion circuit 100. In some implementations, the actuators send control signals to control the duty cycle and switching frequency of the primary switch 106 and secondary switch 108, operating frequency, and direction of power transfer of the isolated DC-DC power conversion circuit 100. The ECUs can also align a plurality of isolated DC-DC power conversion circuits to perform power transfer among a one or more sources and/or loads within an electric vehicle (EV) power transfer system.

At step S502, the controller 300 controls power transfer from the primary side to the secondary side of the isolated DC-DC power conversion circuit 100 by cycling the primary switch 106 on and off at predetermined time intervals based on an amount of power to be transferred. In some implementations, the controller 300 can operate the primary switch 108 with soft switching so that the primary switch 108 is turned on when the current on the primary side of the isolated DC-DC power conversion circuit 100 is approximately zero in order to implement ZCS. Likewise, the primary switch 108 is turned off when the voltage on the primary side is approximately zero to implement ZVS. During one duty cycle of the primary switch 108, power is transferred from the primary to the secondary side of the isolated DC-DC power conversion circuit 100 via the transformer 114, which can be referred to as inductive power transfer, and via the cross-connected capacitors 102 and 104 and leakage inductors 123 and 124, which can be referred to as capacitive power transfer. Details regarding a DC-DC power transfer process are discussed further herein.

At step S504, the control circuitry calculates the SR drive signal 314 based on the sensed secondary transformer winding current 304. The sensed transformer winding current 304 is inverted at inverter 318 to produce an inverted transformer winding current signal 330, and the control circuitry of the controller 300 determines the RS latch set signal 312 based on the inverted transformer winding current signal 330. For example, a differentiation of the inverted transformer winding current 330 is performed at differentiator 326, and clamp 328 clamps the inverted transformer winding current signal 330 within a predetermined voltage range that corresponds to reference voltages for comparators 322 and 324. In one implementation, the inverted transformer winding current signal 330 is clamped within a range from the first reference voltage $V_{ref1}$ to the second reference voltage $V_{ref2}$ but other voltage ranges can also be used. The clamp 328 outputs inverted comparison input 310, which can be compared to the second reference voltage $V_{ref2}$ at the comparator 324. In addition, the comparator 324 can output the RS latch set signal 312 when the inverted comparison input 310 is less than the second reference voltage $V_{ref2}$. In some implementations, the SR drive signal 314 turns on the secondary switch 108 on a rising edge of the RS latch set signal 312.

In addition, the RS latch reset signal 308 is based on the sensed transformer winding current 304. For example, a differentiation of the transformer winding current 304 is performed at differentiator 332, and clamp 334 clamps the secondary transformer winding current 304 within a predetermined voltage range that corresponds to reference voltages for comparators 322 and 324. In one implementation, the secondary transformer winding current 304 is clamped within a range from the first reference voltage $V_{ref1}$ to the second reference voltage $V_{ref2}$ but other voltage ranges can also be used. In addition, the clamp 334 may clamp the secondary transformer winding current 304 within the same voltage range as the clamp 328, but a different voltage range may also be used. The clamp 334 outputs sensed comparison input 306, which can be compared to the first reference voltage $V_{ref1}$ at the comparator 322. In addition, the comparator 322 can output the RS latch reset signal 308 when the sensed comparison input 306 is greater than the first reference voltage $V_{Vref1}$. In some implementations, the SR drive signal 314 turns off the secondary switch 108 on a rising edge of the RS latch reset signal 308.

At step S506, the control circuitry drives the gate driver circuitry for the secondary switch 108 that functions as the SR when power is transferred from the primary side to the secondary side of the isolated DC-DC power conversion circuit 100. The RS set signal 312 and the RS latch reset signal 308 can produce the SR drive signal 314 so that the on-time of the secondary switch 108 is synchronized to when a current through the SR 316 is greater than zero. For example, the secondary switch 108 is turned on when the SR current 316 increases above zero and is turned off prior to the SR current 316 reaching zero as power is transferred from the primary side to the secondary side of the isolated DC-DC power conversion circuit 100 by cycling the primary switch 106 on and off. By synchronizing the on-time of the SR to correspond to when the SR current 316 is greater than zero, the SR improves efficiency of the isolated DC-DC power conversion circuit 100 without interfering with a power transfer duty cycle of the primary switch 106. In addition, even though the SR drive signal 314 is synchronized to the SR current 316 that is greater than zero, the SR drive signal 314 is calculated independently of a current or voltage through the primary switch 106 or secondary switch 108.

Figure 6:
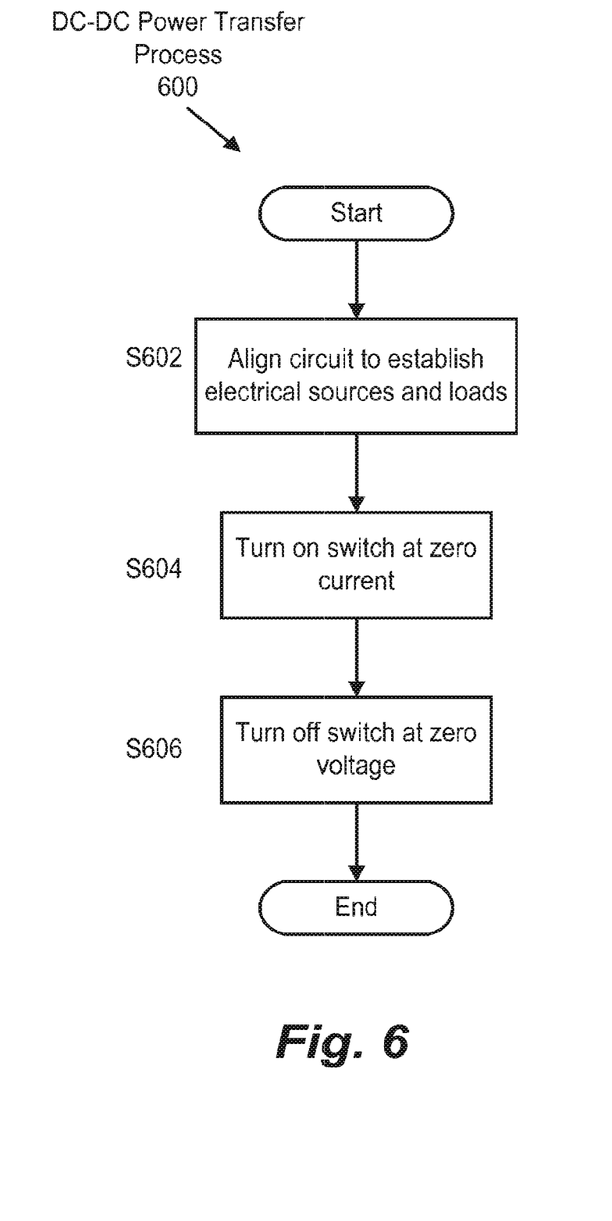
FIG. 6 is an exemplary flowchart of a DC-DC power transfer process.

FIG. 6 is an exemplary flowchart of a DC-DC power conversion process 400, which is an implementation of step S502 of the SR control process 500. In some implementations, the control circuitry can control the amount of power transferred from the primary side to the secondary side of the isolated DC-DC power conversion circuit 100 based on the duty cycle of the primary switch 106.

At step S602, control signals are sent to align at least one isolated DC-DC power conversion circuit 120 based on a desired direction of power transfer. In some implementations, the electrical components are connected at the primary DC power source 110 and secondary DC power source 112 and can function as either power sources or electrical loads. For example, a battery cell in an electrical system of an electric vehicle (EV) can function as a power source to power electrical components of a vehicle, such as brakes, audio systems, and the like. The battery cell can also function as an electrical load during battery cell balancing among a plurality of battery cells. The control circuitry can send control signals to voltage sensors, current sensors, and timers as well as to the primary switch 106 and the secondary switch 108 to align the isolated DC-DC power conversion circuit 120 for the desired direction of power transfer.

At step S604, if power is being transferred from the primary side to the secondary side of the isolated DC-DC power conversion circuit 120, a control signal is sent to turn on the primary switch 106 when the current through the primary switch 106 is zero to implement ZCS. In implementations where power is transferred from the secondary side to the primary side of the isolated DC-DC power conversion circuit 120, a control signal is sent to turn on the secondary switch 108 when the current though the secondary switch $I_{108}$ is zero to implement ZCS. The control circuitry can receive sensor data relating to current at the primary switch 106 to determine when to send the control signal to turn on the primary switch 106. In an implementation, the control signal is sent to a gate driver circuit that turns on the primary switch 106. In some aspects, the gate driver circuits can be integrated into the primary switch 106 and the secondary switch 108. According to some implementations, the time at which the primary switch 106 is turned on can be the beginning of the active signal time for the duty cycle of the primary switch 106.

The amount of power transferred from the primary side to the secondary side of the isolated DC-DC power conversion circuit 120 can be modified by changing an amount of on-time of the primary switch 106. To increase the amount of power transferred from the primary side to the secondary side of the isolated DC-DC power conversion circuit 120, the on-time of the primary switch 106 can be increased. To decrease the amount of power transferred from the primary side to the secondary side of the isolated DC-DC power conversion circuit 120, the on-time of the primary switch 106 can be decreased. In some implementations, when the amount of power transfer is increased or decreased by modifying the amount of on-time, an amount of off-time for the primary switch 106 can remain constant. The quantity of power that is transferred from the primary side to the secondary side of the isolated DC-DC power conversion circuit 100 can also be determined based on the power and voltage characteristics of the electrical components in the electrical system.

At step S606, a control signal is sent to turn off the primary switch 106 to implement ZVS when the voltage at the primary switch 106 is zero, which can end the active signal time for the duty cycle of the primary switch 106. The control circuitry can receive sensor data relating to voltage at the primary switch 106 to determine when to send the control signal to turn off the primary switch 106. In some implementations, capacitive power transfer can occur from the primary side to the secondary side of the isolated DC-DC power conversion circuit 120 through the cross-connected capacitors 102 and 104 until the current through the inductors 123 and 124 goes to zero and the capacitors 102 are negatively charged.

Aspects of the present disclosure are directed to controlling operation of a synchronous rectifier in the isolated DC-DC power conversion circuit 100. Calculating the SR drive signal 314 based on the sensed secondary transformer winding current 304 can improve an accuracy of synchronization of the SR drive signal 314 due to less noise being present in the secondary transformer winding current 304 than in the current or voltage of the primary switch 106 or secondary switch 108. In addition, by synchronizing the on-time of the SR to correspond to when the SR current 316 is greater than zero, the SR improves efficiency of the isolated DC-DC power conversion circuit 100 without interfering with a power transfer duty cycle of the primary switch 106.

Blocks or circuits of computer architecture (i.e., circuitry) shown or described herein can be implemented in a single processing system, or distributed across a plurality of processing systems, which may be referred to as separate processors or circuits. For instance, each of the blocks of architecture can be a discrete processor, system, or logic component. Further, exemplary functions or features can be performed by common circuitry or by a general purpose processor executing specific instructions.

Figure 7:
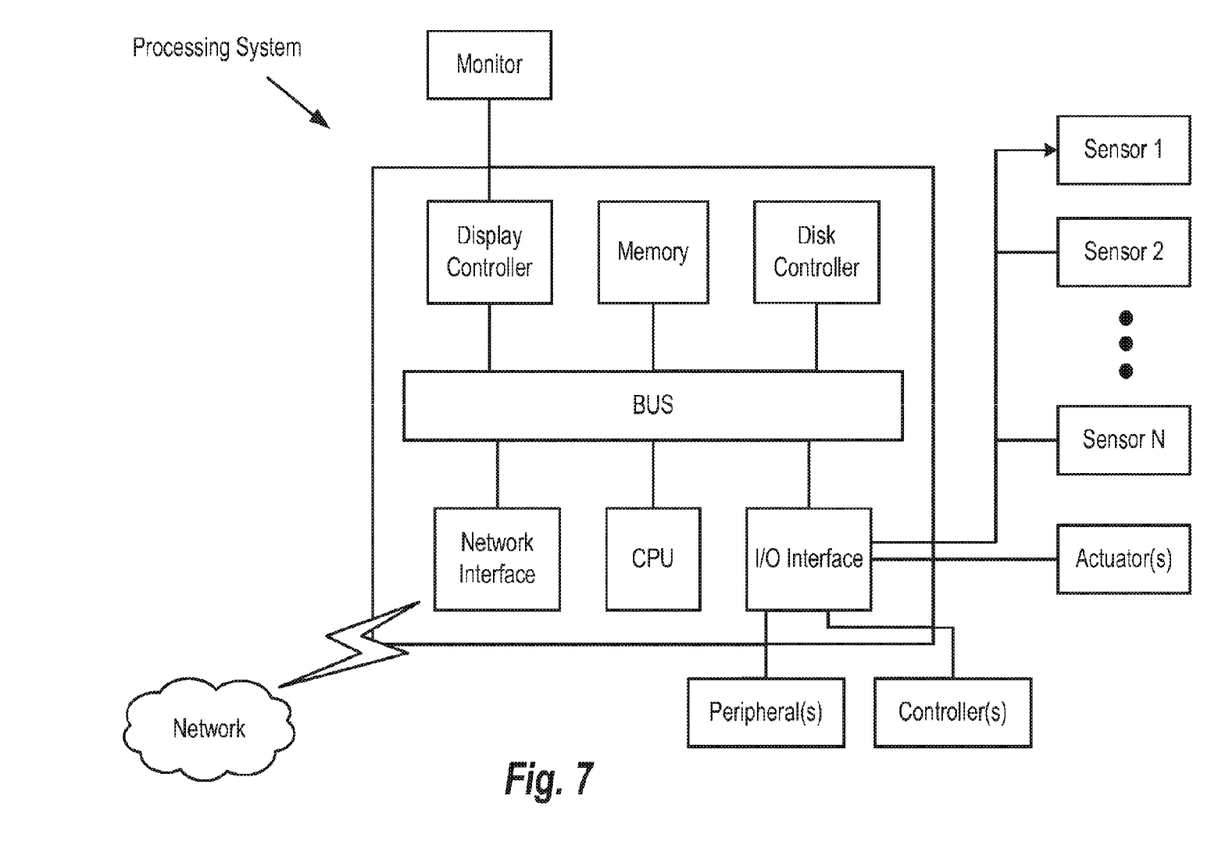
FIG. 7 schematically illustrates a processing system, such as a controller and/or a computer system.

FIG. 7 illustrates an exemplary processing system (i.e., an exemplary processor or circuitry). One or more of such processing systems can be utilized in or to execute one or more algorithms, or portions thereof, or one or more architecture blocks, or portions thereof, in accordance with the descriptions provided herein. The system can be embodied and/or implemented as an electronic control unit (ECU) or a discrete computer installed in a vehicle.

The exemplary processing system can be implemented using one or more microprocessors or the equivalent, such as a central processing unit (CPU) and/or at least one application specific processor ASP (not shown). The microprocessor is circuitry that utilizes a computer readable storage medium, such as a memory circuit (e.g., ROM, EPROM, EPROM, flash memory, static memory, DRAM, SDRAM, and their equivalents), configured to control the microprocessor to perform and/or control the processes and systems of this disclosure. Other storage mediums can be controlled via a controller, such as a disk controller, which can controls a hard disk drive or optical disk drive.

The microprocessor or aspects thereof, in alternate implementations, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The microprocessor can be a separate device or a single processing mechanism. Further, this disclosure can benefit from parallel processing capabilities of a multi-cored CPU. Control circuitry provided by one or more processors in a multi-processing arrangement may also be employed to execute sequences of instructions contained in memory. Alternatively, hard-wired circuitry may be used in place of or in combination with software instructions. Thus, the exemplary implementations discussed herein are not limited to any specific combination of hardware circuitry and software.

In another aspect, results of processing in accordance with this disclosure can be displayed via a display controller to a monitor. The display controller preferably includes at least one graphic processing unit, which can be provided by a plurality of graphics processing cores, for improved computational efficiency. The display controller or portions thereof can also be incorporated into the CPU. Additionally, an I/O (input/output) interface is provided for inputting signals and/or data from a microphone, speakers, cameras, a mouse, a keyboard, a touch-based display or pad interface, etc., which can be connected to the I/O interface as a peripheral. For example, a keyboard or a pointing device for controlling parameters of the various processes or algorithms of this disclosure can be connected to the I/O interface to provide additional functionality and configuration options, or control display characteristics. Moreover, the monitor can be provided with a touch-sensitive or gesture-detecting interface for providing a command/instruction interface.

In an exemplary implementation, the I/O interface is provided for inputting sensor data from Sensors 1, 2 . . . N. The sensors can include battery voltage sensors, temperature sensors, current sensors, or sensors that can detect opening or closing of a switch. Other sensors that input data to the I/O interface may include velocity sensors, acceleration sensors, steering sensors, gyroscope sensors, and the like. In addition, the I/O interface is provided for inputting data from one or more controllers that enable a user to control the configuration of the isolated DC-DC power conversion circuit 120 or distributed power system. For example, the user can use the controller to set up default periods and duty cycles for the primary switch 106 and the secondary switch 108 of the isolated DC-DC power conversion circuit 100. The I/O interface can also provide an interface for outputting control signals to one or more actuators to control various actuated components, including gate driver circuits and other circuitry in the isolated DC-DC power conversion circuit 100. In some implementations, the actuators send control signals to control the duty cycle or switching frequency of the primary switch 106 and secondary switch 108, operating frequency, and direction of power transfer of the isolated DC-DC power conversion circuit 100.

The I/O interface can also be connected to a mobile device, such as a smartphone and/or a portable storage device. The I/O interface can include a Universal Serial Bus (USB) hub, Bluetooth circuitry, Near Field Communication (NFC) circuitry, or other wired or wireless communication circuits. In some aspects, the mobile device can provide sensor input, navigation input, and/or network access.

The above-noted components can be coupled to a network, such as the Internet or a local intranet, via a network interface for the transmission or reception of data, including controllable parameters. The network interface can include one or more IEEE 802 compliant circuits. A central BUS is provided to connect the above hardware components/circuits together and provides at least one path for digital communication there between.

The processing system may be a networked desktop computer, terminal, or personal device, such as a tablet computer or a mobile phone. The database discussed above may be stored remotely on a server, and the server may include components similar to or the same as the processing system. These devices may communicate via the network.

Suitable software, such as an operating system or an application, can be tangibly stored on a computer readable medium of a processing system, including the memory and storage devices. Other examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read. The software may include, but is not limited to, device drivers, operating systems, development tools, applications software, and/or a graphical user interface.

Computer code elements on the above-noted medium may be any interpretable or executable code mechanism, including but not limited to scripts, interpretable programs, dynamic link libraries (DLLs), Java classes, and complete executable programs. Moreover, parts of the processing of aspects of this disclosure may be distributed for better performance, reliability and/or cost.

The procedures and routines described herein can be embodied as a device, system, method, or computer program product, and can be executed via one or more dedicated circuits or programmed processors. Accordingly, the descriptions provided herein may take the form of exclusively hardware, exclusively software executed on hardware (including firmware, resident software, micro-code, etc.), or through a combination of dedicated hardware components and general processors that are configured by specific algorithms and process codes. Hardware components are referred to as a "circuit," "module," "unit," "device," or "system." Executable code that is executed by hardware is embodied on a tangible memory device, such as a computer program product. Examples include CDs, DVDs, flash drives, hard disk units, ROMs, RAMs, and other memory devices.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:

1. A system comprising:
DC-DC power conversion circuitry including a first switch and a second switch on either side of a transformer wherein the second switch is configured to operate as a synchronous rectifier, the transformer being connected to the first and second switches such that currents and voltages in both windings of the transformer are in phase; and
control circuitry including an RS latch that outputs a drive signal to the second switch, the control circuitry being configured to
control power transfer from a primary side to secondary side of the DC-DC power conversion circuitry via the first switch,
calculate the drive signal for the second switch based on a sensed transformer winding current, and
control operation of the second switch based on the drive signal by generating a control signal for the RS latch based on a differentiation of an inverted sensed transformer winding current.

2. The system of claim 1, wherein the DC-DC power conversion circuitry includes a first capacitor and a second capacitor cross-connected across the transformer.

3. The system of claim 1, wherein the primary side and the secondary side of the DC-DC power conversion circuitry are symmetric across the transformer.

4. The system of claim 1, wherein the DC-DC power conversion circuitry is configured to perform bi-directional power transfer.

5. The system of claim 4, wherein the first switch is configured to operate as the synchronous rectifier when power is transferred from the secondary side to the primary side of the DC-DC power conversion circuitry.

6. The system of claim 1, wherein the DC-DC power conversion circuitry includes a first diode in parallel with the first switch and a second diode in parallel with the second switch.

7. The system of claim 1, wherein the sensed transformer winding current corresponds to a transformer winding on a side of the DC-DC power conversion circuitry corresponding to the second switch.

8. The system of claim 1, wherein the control circuitry is further configured to calculate the drive signal for the second switch independent of a voltage or current of the first switch or the second switch.

9. The system of claim 1, wherein the control circuitry is further configured to synchronize an on period of the second switch to a synchronous rectifier current that is greater than zero.

10. The system of Claim 1, wherein a latch set signal corresponds to a turn-on of the second switch and a latch reset signal corresponds to a turn-off of the second switch.

11. The system of Claim 1, wherein the control circuitry is further configured to generate the latch set signal when the inverted sensed transformer winding current is less than a first threshold.

12. The system of claim 10, wherein the control circuitry is further configured to generate the latch reset signal based on the sensed transformer winding current.

13. The system of claim 12, wherein the control circuitry is further configured to generate the latch reset signal based on a differentiation of the sensed transformer winding current.

14. The system of claim 13, wherein the control circuitry is further configured to generate the latch reset signal when the sensed transformer winding current is greater than a second threshold.

15. A method comprising:
controlling power transfer from a primary side to secondary side of DC-DC power conversion circuitry including a first switch and a second switch on either side of a transformer wherein the second switch is configured to operate as a synchronous rectifier via the first switch, the transformer being connected to the first and second switches such that currents and voltages in both windings of the transformer are in phase;
calculating a drive signal for the second switch based on a sensed transformer winding current;
outputting the drive signal to the second switch from an RS latch; and
controlling operation of the second switch based on the drive signal by generating a control signal for the RS latch based on a differentiation of an inverted sensed transformer winding current.

16. A non-transitory computer-readable storage medium including executable instructions, which when executed by circuitry, causes the circuitry to perform the method according to claim 15.

17. A system controller comprising:
circuitry including an RS latch that outputs a drive signal to a second switch, the control circuitry being configured to
control power transfer from a primary side to secondary side of DC-DC power conversion circuitry including a first switch and the second switch on either side of a transformer wherein the second switch is configured to operate as a synchronous rectifier via the first switch, the transformer being connected to the first and second switches such that currents and voltages in both windings of the transformer are in phase;
calculate the drive signal for the second switch based on a sensed transformer winding current; and
control operation of the second switch based on the drive signal by generating a control signal for the RS latch based on a differentiation of an inverted sensed transformer winding current.

* * * * *